Oct. 17, 1944.  J. P. MINTON  2,360,507
APPARATUS FOR RECORDING SEISMIC WAVES
Filed Oct. 1, 1941  3 Sheets-Sheet 1

Inventor
John P. Minton
By Dallas R. Lamont
Attorney

Patented Oct. 17, 1944

2,360,507

UNITED STATES PATENT OFFICE 2,360,507

APPARATUS FOR RECORDING SEISMIC WAVES

John P. Minton, Dallas, Tex., assignor to Socony-Vacuum Oil Company, Incorporated, New York, N. Y., a corporation of New York Application October 1, 1941, Serial No. 413,116

5 Claims. (Cl. 177—352)

This invention relates generally to geophysical prospecting and more particularly to a system and apparatus for recording seismic waves.

In the art of reflection seismic surveying, interpretation of records is often based on the comparison of a plurality of traces. That is, corresponding reflections on the independent traces are identifiable by their nearly-in-phase characteristics.

Since a geophone spread for reflection surveying offtimes covers a distance of as much as 2000 feet, it is not always possible to record distinguishable reflections on all traces. This is possibly due to the existence of an unconformity in the substrata occasioned by conditions such as faulting. Where such conditions exist, it has been found that by mixing the geophone outputs from a selected number of stations, it is possible to trace a reflection entirely across the record from the first to the last trace.

Additionally, in some areas considerable lensing of substrata is encountered. Where such conditions exist errors are frequently made as a result of the interpreter confusing reflections from the stratum being profiled with lenses which lie adjacent the stratum. By properly mixing the signals from the individual detecting stations, such possibility of error is eliminated.

Heretofore, in order to effect a mixing of signals it has been necessary to connect groups of two or three detecting stations in multiple and record the combined output of the geophones on a single trace. This, however, was objectionable since each trace recorded on the seismogram would represent independent groups of detecting stations corresponding to the number selected in such a manner that there would be no overlapping between traces. Additionally, obtainable data was reduced by a factor equal to the number of stations connected in series.

By means of the instant invention it is possible to overcome these difficulties and produce a record that will have one trace less than the number of detecting stations and which will represent any selected grouping that will overlap from the first to the last trace.

Therefore, the primary object of this invention resides in the provision of a system and apparatus whereby a maximum of data can be recorded with any form of mixing desired.

Another object of this invention resides in the provision of a system and apparatus for recording seismic waves that are detected by modulating a high frequency carrier wave, amplifying the high frequency carrier wave, then rectifying and recording the rectified output signals after the carrier frequency has been eliminated.

Still another object of this invention resides in the provision of detecting means in each of the amplifier circuits which consist of full wave copper oxide rectifiers.

Another object of this invention resides in the novel manner of mixing adjacent amplifier channels through the medium of the copper oxide rectifiers without producing cross-feeding to channels outside of the selected group.

Still another object of this invention resides in the provision of a means of recording seismic waves from a plurality of detecting stations by combining the signals from a succession of a selected number of stations in such a manner that each succeeding trace recorded will be an overlap of the stations recorded on the first trace but for one station.

Still another object of this invention resides in the provision of a system of recording seismic waves which is sufficiently flexible that any desired method of mixing can be accomplished without producing undesirable cross-feeding to traces outside of the selected group.

Other objects and advantages will become apparent from the following detailed description when considered with the accompanying drawings in which.

Figure 1:
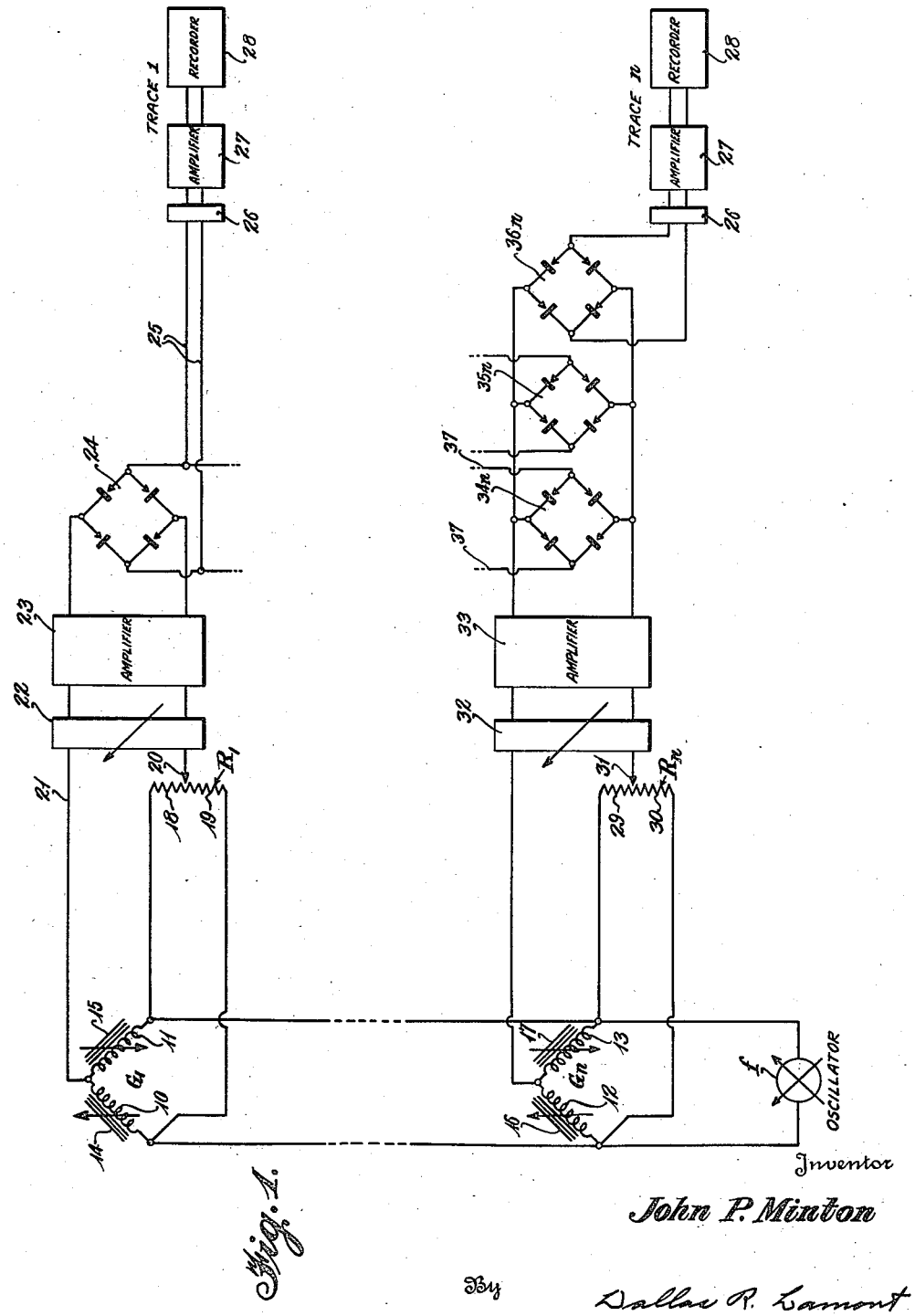
Figure 1 shows a circuit diagram for the first and an intermediate channel of an electric seismograph recording system in which mixing is effected by triples.

Referring to Figure 1 of the drawings, there are shown two channels of an electric seismograph. These channels are the type which utilize inductance type geophones $G_1$ and $G_n$ which modulate a carrier wave which is supplied by the oscillator $f$ and which is of relatively high frequency compared to the seismic waves. The frequency of the carrier wave may be in the order of 500 to 1000 cycles. Modulation of the carrier wave is effected by a change in the inductance of the coils 10 and 11, and 12 and 13, by relative movement between the cores 14 and 15, and 16 and 17, of the coils and the armature, effected by oscillations produced by the seismic waves. Coils 10 and 11 of the geophone $G_1$ form two arms of a reactance bridge circuit, the other two arms being formed by the sections 18 and 19 of a resistance $R_1$. This reactance bridge circuit may be used in balanced or unbalanced condition by adjusting the contactor 20 on the resistance $R_1$. The output signals from the geophone $G_1$ which is a high frequency carrier wave modulated at the frequency of the seismic waves is, by means of the conductors 21, conducted to a band pass filter 22. The filter 22 passes both the carrier and side band frequencies in either the balanced or unbalanced operation of the geophones $G_1$—$G_n$. This filter eliminates any extraneous frequencies that may be present outside the pass band. From the band pass filter 22, the signals pass into the amplifier 23 where they are amplified. After amplification, the signals are detected by means of a full wave copper oxide rectifier 24. The output signals from the copper oxide rectifier are conducted by means of conductors 25 to the filter 26, where the carrier wave, when present, and other unwanted frequencies are eliminated and, if necessary, further amplified in the amplifier 27 and recorded by the recorder 28 on a moving sensitized paper or photographic film in coordination with time.

Each of the geophones $G_1$—$G_n$ may be of the type disclosed and claimed in my copending application Serial Number 517,731, filed January 10, 1944, for "Geophysical prospecting apparatus," this said application being a continuation-in-part of an earlier filed application, Serial Number 411,766.

Geophone $G_1$ in Fig. 1 represents the first geophone in a spread made up of a plurality of geophones collaterally spaced from a source of creation of seismic waves. Geophone $G_n$ is another geophone in the same spread which for purpose of illustration may be any number of stations further removed from the point of creation of the seismic waves than the geophone $G_1$. In like manner, $G_n$ modulates the high frequency carrier wave that is supplied by the source $f$ in a reactance bridge circuit which comprises the coils 12 and 13 of the geophone and sections 29 and 30 of the resistance $R_n$. Balancing of the reactance bridge circuit is effected by adjustment of the contactor 31. The output signals from the reactance bridge circuit are passed through the band pass filter 32, which acts similarly to filter 22 to eliminate extraneous frequencies, amplified at 33 and detected by means of the copper oxide rectifiers $34_n$, $35_n$ and $36_n$. Three copper oxide rectifiers are shown in this circuit to illustrate a spread in which mixing is effected by triples. The rectifier $34_n$ is connected by means of conductors 37 to a like rectifier $34_{n-1}$ in an adjacent channel for a geophone $G_{n-1}$, not shown, which in turn is similarly connected to a rectifier $34_{n-2}$ in a channel that is adapted to amplify and detect signals from a geophone $G_{n-2}$, not shown. These connections are described in detail in the following paragraphs.

Figure 2:
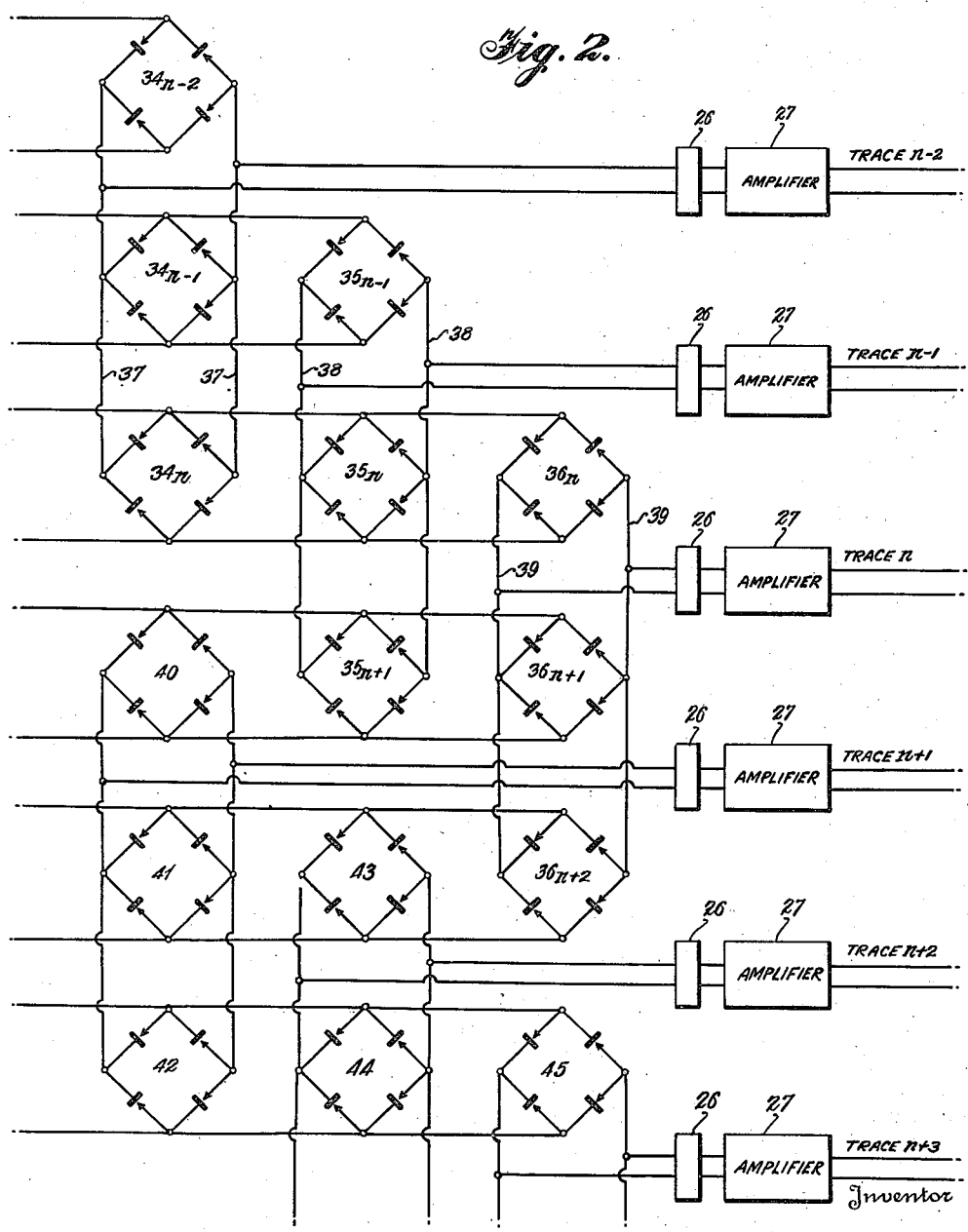
Figure 2 is a wiring diagram of a plurality of adjacent channels in which mixing is effected by triples in such a manner that overlapping is obtained from the first to the last channel.

This connection is effected in the manner illustrated in Figure 2. The rectifier $35_n$ is connected by means of conductors 38 to a second rectifier $35_{n-1}$ in an adjacent channel and to a third rectifier $35_{n+1}$ in an adjacent channel on the opposite side of rectifier $35_n$. In like manner, the output of rectifier $36_n$ is connected by means of conductors 39 to rectifiers $36_{n+1}$ and $36_{n+2}$ in the next two channels of the spread.

With an arrangement of connections described above and illustrated in Figure 2, it is possible to record on trace $n-2$ a record that is a composite of the output signals from geophones $G_{n-2}$, $G_{n-1}$, and $G_n$. The trace $n-1$ will be a composite of the signals from geophones $G_{n-1}$, $G_n$ and $G_{n+1}$, and the trace $n$ will be a composite of signals from geophones $G_n$, $G_{n+1}$ and $G_{n+2}$. Since these copper oxide rectifiers are unidirectional conductors, the output signals cannot feed back through them into their inputs from which they would affect other traces.

Therefore, it becomes readily apparent that adjacent traces will have recorded on them signals from triples which overlap but for one station in each instance. The mixing can be carried throughout the spread to produce a seismogram that will emphasize the reflections recorded on the traces from the first to the last trace, thereby enabling the interpreter to easily follow a group of reflections from those detected at the beginning of the spread to those detected at the last geophone in the spread without the possibility of erroneously selecting impulses on the last trace that do not correspond to the reflections recorded on the first trace.

Rectifiers 40, 41 and 42 represent still another triple, the composite signals from which are recorded on trace $n+1$, while rectifiers 43 and 44 are a part of another triple, the composite output signals from which are recorded on trace $n+2$, and rectifier 45 is a part of still another triple, the composite output signals from which are recorded on the trace $n+3$.

Figure 3:
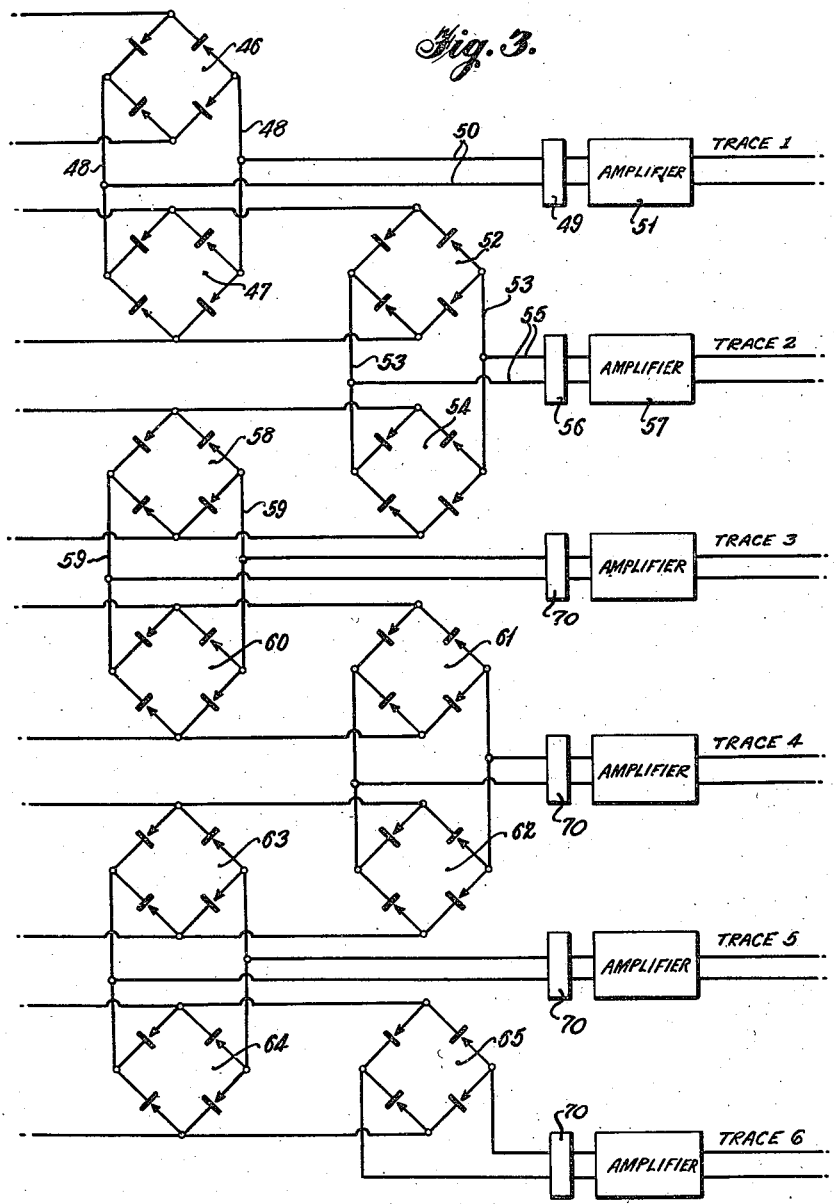
Figure 3 is a wiring diagram illustrating the manner in which mixing is effected by doubles which overlap.

The instant invention thus far has been described in connection with the use of triples. As shown in Figure 3, mixing by doubles may be effected. The output from two adjacent seismograph channels are combined by means of the rectifiers 46 and 47 and the conductors 48, and conducted to a filter 49 by means of conductors 50. The output from the filter 49 is then amplified by the amplifier 51 and recorded on trace No. 1 of a seismogram by means of a recording galvanometer, not shown. Rectifiers 47 and 52 are connected in parallel on the second channel. Likewise, the inputs of rectifiers 54 and 58 are connected together on channel No. 3. The outputs of rectifiers 52 and 54 are connected together, filtered in 56 to exclude the carrier, amplified by 57 and recorded as trace No. 2, of the seismogram. In any individual horizontal array of the rectifiers, the inputs are all connected in parallel to the corresponding channel number. In the individual vertical arrays, the outputs are connected together leading to the appropriately indicated trace. Filters 49 and 56, as well as the corresponding filters 70 in the other channels are for the purpose of excluding the carrier frequency, when present, and other unwanted frequencies, in order that the signals may be amplified and recorded corresponding to the seismic waves. Rectifiers 54 and 58 are connected in parallel in channel No. 3 of an electric seismograph. The output from rectifier 58 is, by means of conductors 59, connected to rectifier 60 in channel No. 4. The composite output of these two rectifiers are in the manner described above recorded on trace No. 3. In like manner, the output from the doubles comprising rectifiers 61 and 62, and 63 and 64, are respectively recorded on traces Nos. 4 and 5 of the seismogram, while the output from rectifier 65 will be unmixed signals and will be recorded on trace No. 6 of the seismogram. Any number of successive stations in the spread can in this manner be mixed by doubles so that an overlapping is effected from the first to the last station.

Although the present invention has been described in connection with mixing by doubles and triples, it is obvious from the above detailed description when taken with the drawings to those skilled in the art, that mixing by quadruples or any other desired combination can be effected.

I claim:

1. In an apparatus for recording seismic waves that have been created in the earth's surface and detected at a plurality of stations by modulating a common high frequency carrier wave at the frequency of the seismic waves, amplifiers for independently amplifying the resultant signals from each station, at least one balanced bridge full wave rectifier in each amplifier circuit, means for mixing the output of one rectifier in each of a succession of adjacent channels in groups comprising a selected number of amplifiers, means for filtering the carrier wave from the mixed composite signal, and means for recording the output signals from each filter on independent traces of a seismogram.

2. In a system, for recording seismic waves which have been created in the earth's surface and detected at a plurality of stations by modulating a common high frequency carrier wave at the frequency of the seismic waves, having amplifiers for independently amplifying the resultant signals from each station and recording devices for producing independent traces of a seismogram, the combination of means for producing an output signal for recordation on a trace of said seismogram which is a composite signal from a group of said stations comprising a balanced bridge full wave rectifier in each amplifier circuit in said group, an output circuit, means connecting said full wave rectifiers in parallel with each other and with said output circuit, means for filtering the carrier wave from the mixed composite signal applied to said output circuit, and means for applying said composite signal to one of said recording devices for recordation on a trace of said seismogram.

3. In a system for recording seismic waves which have been created in the earth's surface and detected at a plurality of stations by modulating a common high frequency carrier wave at the frequency of the seismic waves, which system includes amplifiers for independently amplifying the resultant signals from each station and recording devices for producing independent traces of a seismogram, the combination of means for producing an output signal for recordation on a trace of said seismogram which is a composite signal from a group of said stations comprising a balanced bridge full wave copper oxide rectifier in each amplifier circuit in said group, an output circuit, means connecting said full wave rectifiers in parallel with each other and with said output circuit, means for filtering the carrier wave from the mixed composite signal applied to said output circuit, and means for applying said composite signal to one of said recording devices for recordation on a trace of said seismogram.

4. In a system, for recording seismic waves which have been created in the earth's surface and detected at a plurality of stations by modulating a common high frequency carrier wave at the frequency of the seismic waves, having amplifiers for independently amplifying the resultant signals from each station and means for recording output signals on independent traces of a seismogram, the combination of means for electrically producing a mixed composite signal from selected groups of said amplifiers comprising a balanced bridge full wave rectifier for the output signals of each amplifier of each group, and an additional balanced bridge full wave rectifier for the output signals of each amplifier circuit which also forms a part of another group for production of another mixed composite signal, an output circuit for each group of amplifiers for operating said recording means to produce a single trace of said seismogram, means connecting in parallel with each said output circuit one of said full wave rectifiers in each amplifier circuit included in one of said groups, and means for filtering the carrier wave from the mixed composite signal from each said group whereby there are recorded on independent traces of said seismogram said mixed composite signals from each group of said amplifiers.

5. In a system for recording seismic waves which have been created in the earth's surface and detected at a plurality of stations by modulating a common high frequency carrier wave at the frequency of the seismic waves, which system includes amplifiers for independently amplifying the resultant signals from each station and means for recording output signals on independent traces of a seismogram, the combination of means for electrically producing a mixed composite signal from each of a plurality of selected groups of said amplifiers comprising a balanced bridge full wave copper oxide rectifier for the amplified output signals of each amplifier of each group, and an additional balanced bridge full wave copper oxide rectifier for the output signals of each amplifier which also forms a part of another group for production of another mixed composite signal, an output circuit for each group of amplifiers for operating said recording means to produce a single trace of said seismogram, means connecting in parallel with each said output circuit one of said full wave rectifiers in each amplifier circuit included in one of said groups, and means for filtering the carrier wave from the mixed composite signal from each said group, whereby there is recorded on each independent trace of the seismogram said mixed composite signal from each group of said amplifiers.

JOHN P. MINTON.